Oct. 30, 1928.

W. COMERFORD.

DRAIN VALVE FOR AUTOMOBILE CRANK CASES

Filed Aug. 13, 1923

1,689,994

Inventor
William Comerford
By Sturtevant Mason
Attorneys

Patented Oct. 30, 1928.

1,689,994

UNITED STATES PATENT OFFICE.

WILLIAM COMERFORD, OF BUFFALO, NEW YORK, ASSIGNOR OF ONE-FIFTH TO MINNIE J. COMERFORD, ONE-FIFTH TO MARY COMERFORD, ONE-FIFTH TO EILEEN COMERFORD, AND ONE-FIFTH TO JOSEPH P. COMERFORD, ALL OF BUFFALO, NEW YORK.

DRAIN VALVE FOR AUTOMOBILE CRANK CASES.

Application filed August 13, 1923. Serial No. 657,110.

My invention relates to improvements in drain valves for automobile crank cases.

The object of the invention is to provide a drain valve for a crank case which can be operated from within the hood of an automobile and thus prevent the necessity for getting under the engine to drain the crank case and at the same time provide a drain valve which can be readily attached to any of the crank cases without any modification thereof.

Another object of my invention is to provide a valve of this character which can be readily applied to a crank case by the ordinary layman and at the same time provide a simple, cheap and effective valve having certain details of structure and combination of parts hereinafter more fully set forth.

Figure 1:
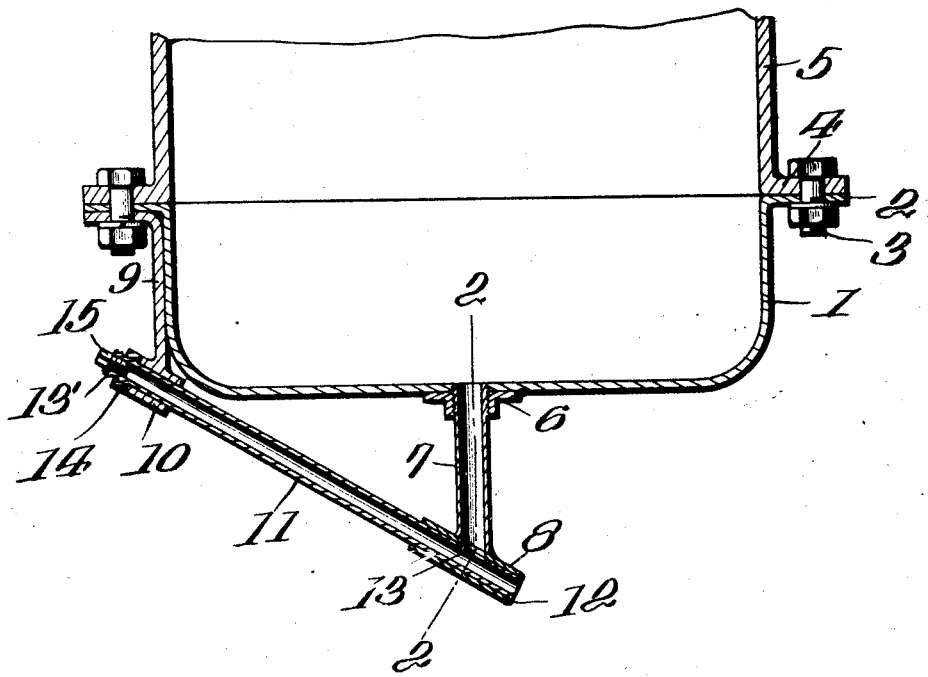
Figure 1 is a transverse sectional view of the crank case of an automobile engine showing my improved drain valve applied thereto.
Figure 2:
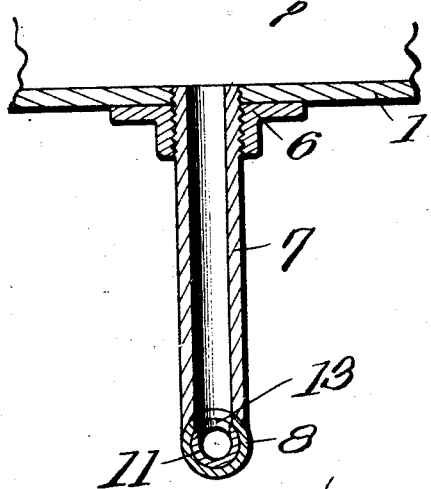
Figure 2 is a vertical sectional view taken at right angles to Figure 1.

Referring now to the drawings; 1 represents the crank case of an automobile engine which is provided with flanges 2 secured by bolts 3 to the flange 4 of the cylinder block 5. All of this is of the ordinary construction and needs no further description.

The crank case of the ordinary automobile engine is provided with a drain opening 6 in the bottom of the crank case. This opening is usually closed by a threaded plug. Applicant's invention is directed to a very simple attachment for controlling the draining of the oil from the crank case through this opening and includes a pipe 7 which is threaded into the opening 6. This pipe has rigidly secured to its lower end a short length of pipe 8, which is arranged at an acute angle to the pipe 7 and which has an opening communicating with the pipe 7. Attached to the crank case is a bracket 9 having at its lower end a cylindrical bearing 10 which is in alinement with and at the same angle as the pipe 8 on the lower end of the pipe 7.

Extending through the cylindrical bearing 10 and the pipe 7 is a control valve pipe 11. This pipe 11 has an opening 13 in the side wall thereof which is adapted to register with the open end of the pipe 7. The extreme lower end of the pipe 11 is turned outwardly so as to limit the upward movement of the pipe 11 in the pipe 8. When the opening 13 is in register with the opening leading to the pipe 7, then the oil will drain down through the pipe 7 into the pipe 11 and out through the open end of the pipe 11. When said pipe 11 is rotated so as to bring the opening 13 out of registry with the opening leading to the pipe 7, then the flow of the oil will be cut off.

The upper end of the pipe 11 beyond the bearing 10 is screw-threaded as indicated at 13' and a nut 14 threaded onto the pipe bears against the bearing 10 of the bracket 9 and holds the pipe 11 from endwise movement in the bearing 10. The upper end of the pipe 11 is internally threaded for a nut plug 15 which is screwed into the same. Upon loosening the nut 14 a wrench may be applied to the nut plug 15 for turning the pipe 11, and when the pipe 11 is turned to close the outlet, then the nut 14 may be turned down so as to secure the pipe 11 in the set position with the opening closed.

It will be understood, of course, that other means may be utilized for turning the pipe 11; also that the pipe 11 only functions as a pipe from the opening 13 to the discharge end thereof, and therefore the upper portion of this pipe 11 can be changed as to structure.

The essential features of the invention consist in the rotatable section of pipe serving as a valve for controlling the discharge of the oil from the crank casing, and the operating means which is in line therewith and which extends to a point at the side of the engine casing where it is accessible for operation.

Having thus described my invention, what I claim as new and desire to secure by Letters Patent, is:

1. The combination with a crank case of an automobile, of a discharge pipe connected to the bottom of the crank case, an obliquely arranged pipe rigidly carried by the lower end of the discharge pipe and communicating therewith, a valve pipe extending through the obliquely arranged pipe and having an opening in one side, and said valve pipe being rotatable in said obliquely arranged pipe so that the opening will establish a communication between said pipes and such communication be closed selectively, and a bracket carried by the side of the crank case and supporting the upper end of the last mentioned pipe, and means for operating and locking the last mentioned pipe in its adjusted position.

2. The combination with a crank case of an automobile, of a discharge pipe connected to the bottom of the crank case, an obliquely arranged pipe connected to the lower end of the discharge pipe in communication therewith, a pipe rotatably mounted in the obliquely arranged pipe and having an opening adapted to communicate with the lower end of the discharge pipe, a bracket carried by the crank case through which the upper end of the last mentioned pipe extends, a lock nut on the upper end of the pipe for locking the same to the bracket against rotation, and means for rotating said pipe.

3. The combination with a crank case of an automobile, of a pipe secured to the bottom of the crank case, an obliquely arranged pipe rigidly secured to the lower end of the discharge pipe and in communication therewith, a pipe rotatably mounted in the obliquely arranged pipe and having an opening adapted to communicate with the opening in the lower end of the discharge pipe, a bracket secured to the crank case and having enlarged bearing through which the upper end of the last mentioned pipe passes, a nut screwed upon the upper end of the pipe and engaging the bracket for locking the pipe in its adjusted position, and means for receiving a tool for rotating said pipe.

4. The combination with a crank case of an automobile, of a discharge pipe connected to the bottom of the crank case, an obliquely arranged pipe rigidly carried by the lower end of the discharge pipe and in communicaton therewith, a pipe extending through the obliquely arranged pipe and secured against upward movement therein and having an opening communicating with the lower end of the discharge pipe, a bracket secured to the crank case and having an enlarged obliquely arranged bearing through which the upper end of the pipe extends, a nut screwed upon the upper end of the pipe and adapted to engage the bearing, and means carried by the upper end of the pipe for receiving a tool whereby the same can be rotated.

5. The combination with a crank casing of an automobile, of a discharge pipe connected with the bottom of the crank casing, an obliquely arranged pipe connected to the lower end of said first-named pipe and having an opening communicating therewith, a bracket attached to the side of the casing and having a sleeve bearing in alinement with the oblique pipe, a hollow cylindrical valve mounted in said oblique pipe and sleeve bearing and having an opening adapted to be brought into registry with the opening in the oblique pipe or to turn so as to close said opening, and means for securing said cylindrical valve in set position for closing the drain opening.

6. A detachable oil drain and valve for the crank casing of an automobile comprising a discharge pipe adapted to be connected with the bottom of the crank casing, an obliquely arranged pipe connected to the lower end of said first named pipe and having an opening communicating therewith, a bracket adapted to be attached at the side of the crank casing and having a sleeve bearing in alinement with the oblique pipe, a tube member constituting a hollow cylindrical valve and operating stem mounted in said oblique pipe and sleeve bearing, and having an opening adapted to be brought into registry with the opening in the oblique pipe or to be turned so as to close said opening, said tube serving when in registry to permit the drainage of oil from said crank casing into and through said tube to be discharged from the lower end thereof, and means for securing said tube in set position for closing the drain opening.

7. The combination with the crank casing of an automobile, of a discharge pipe connected to the bottom of the crank casing, an obliquely arranged pipe connected to the lower end of the discharge pipe and having an opening at its side to establish communication therewith, a tube rotatably mounted in the obliquely arranged pipe and constituting a hollow cylindrical valve and having a side opening therein adapted to communicate with the lower end of the discharge pipe through said first opening, a bracket carried by the crank casing and providing a journal for the upper end of said tube, the lower end of said tube having a peripheral flange to engage the lower end of said obliquely arranged pipe to prevent axial movement of said tube in one direction, the upper end of said tube being threaded, and a lock nut on the threaded upper end of the tube to limit movement of the tube in the other direction, said lock nut being adaped to cooperate with said bracket to prevent rotation of said tube about its axis.

In testimony whereof, I affix my signature.

WILLIAM COMERFORD.